Feb. 6, 1945. S. G. WINGQUIST Re. 22,600

UNIVERSAL JOINT

Original Filed May 9, 1939 3 Sheets-Sheet 1

Inventor,
S. G. Wingquist

By: Glascock Downing & Seebold
Attys.

Inventor
S. G. Wingquist
By: Glascock Downing & Seebold
Attys

Feb. 6, 1945. S. G. WINGQUIST Re. 22,600

UNIVERSAL JOINT

Original Filed May 9, 1939 3 Sheets-Sheet 3

Inventor,
S. G. Wingquist

By: Glascock Downing & Seebold
Attys.

Reissued Feb. 6, 1945

Re. 22,600

UNITED STATES PATENT OFFICE 22,600

UNIVERSAL JOINT

Sven Gustaf Wingquist, Remningstorp, Skara, Sweden

Original No. 2,236,633, dated April 1, 1941, Serial No. 272,657, May 9, 1939. Application for reissue March 5, 1942, Serial No. 433,525. In Sweden April 4, 1939

12 Claims. (Cl. 64—21)

The present invention relates to a universal joint having a single center of deflection and has for its object to bring about such a joint of a simple and compact construction, which is kept together axially by itself and in which the variety with respect to the angular speeds of the driving and the driven member of the joint can be chosen at will.

The invention consists essentially in this that placed between a driving and a driven member, provided with diametrically or substantially diametrically opposed conical, plane or curved races, is a single rigid transmission member provided with roller members having a conical or cylindrical shape or a curved generatrix corresponding to and bearing against said races and also with bevelled toothed rims or segments, which mesh with corresponding toothed segments on the driving and driven members of the joint and serve to adjust the transmission member to take up a position in a plane preferably passing through the bisectrix of the axes of the joint members and deviating from the bisectrix-plane of said axes and also to keep the joint members together in the axial direction and to take up axial forces acting on said members. Here and in the following the bisectrix-plane is assumed to be the plane, which, passing through the bisectrix of the axes of the joint members, is perpendicular to the plane containing the said axes.

Figure 1:
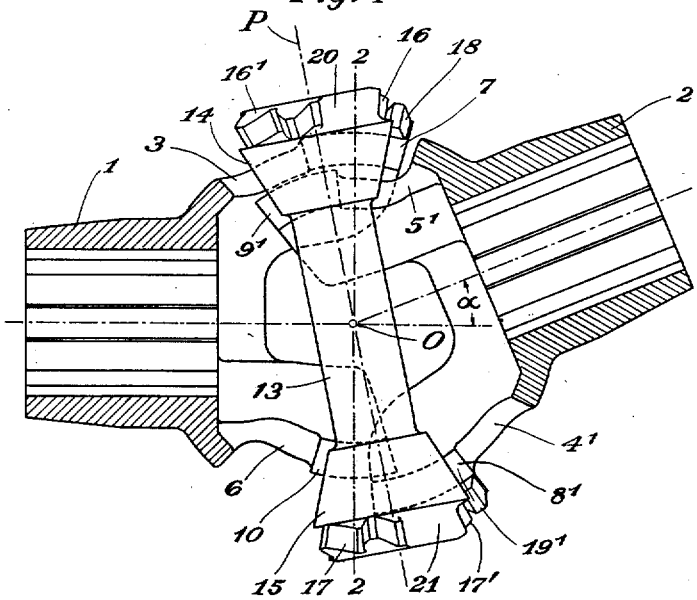
Figure 2:
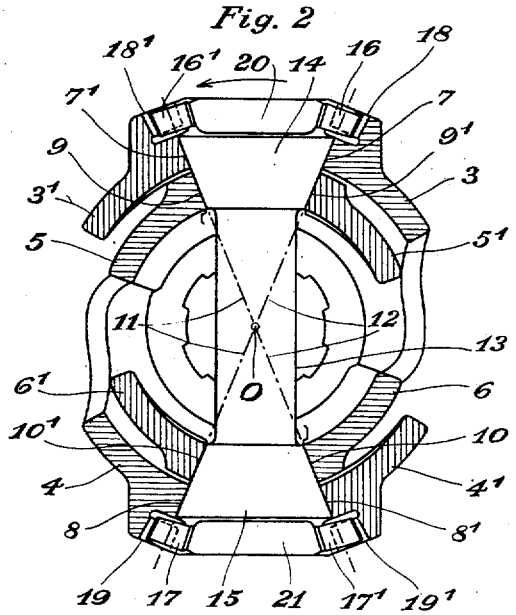
Figure 3:
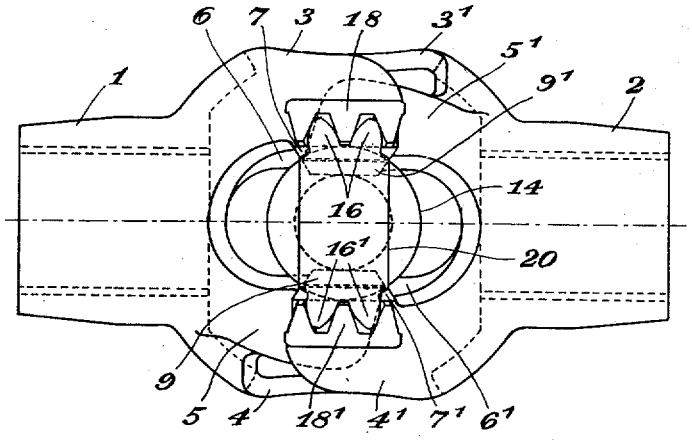
Figure 4:
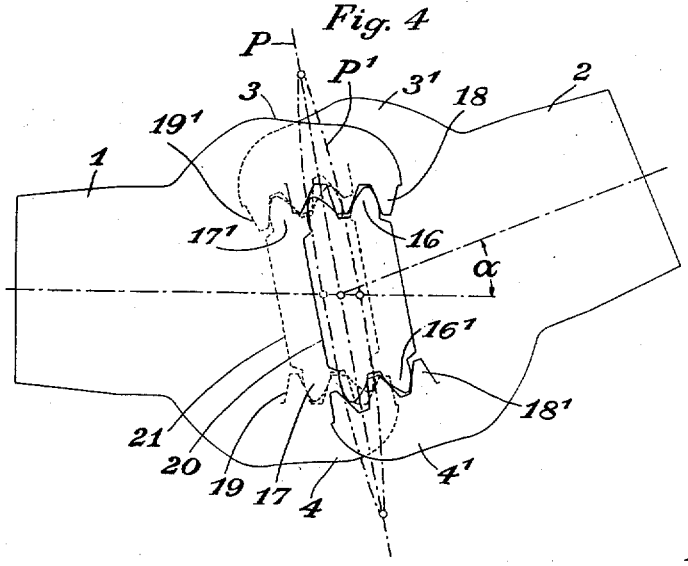
Figure 5:
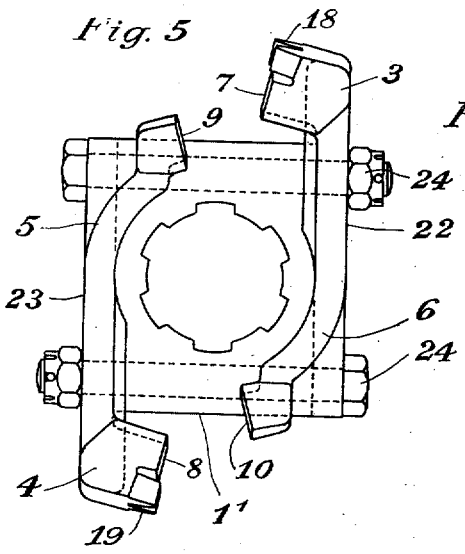
Figure 7:
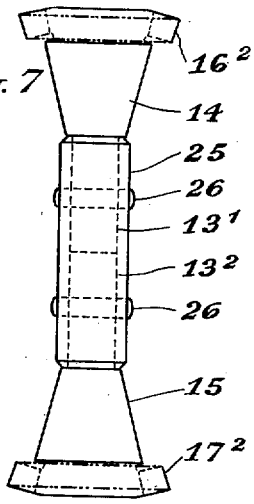
Figure 6:
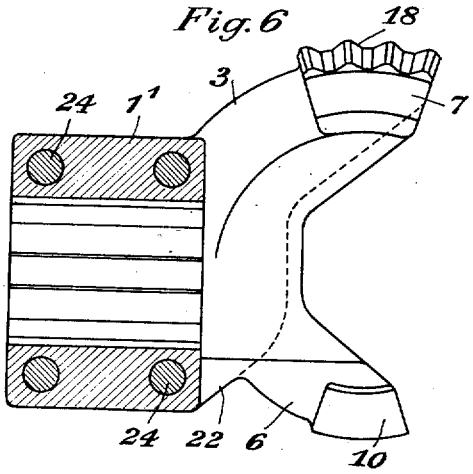
Figure 8:
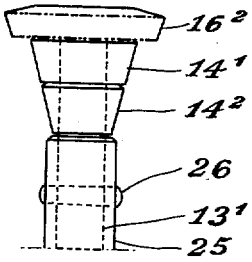
Figure 9:
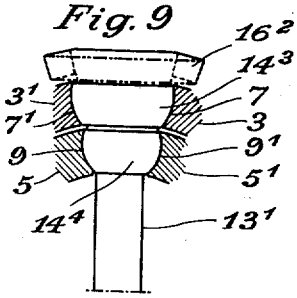
Figure 10:
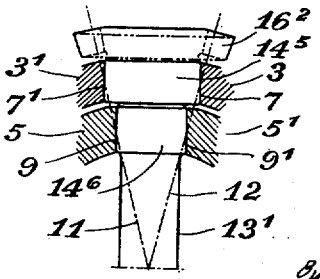

In the annexed drawings some embodiments of a universal joint according to this invention are shown. Fig. 1 is an axial section of a universal joint according to one embodiment having the joint members placed at an angle to each other. Fig. 2 is a cross-section along the line 2—2 in Fig. 1, viewed from the right, the joint members being placed coaxially. Fig. 3 is a top view of the joint with the members placed coaxially, and Fig. 4 is a similar diagrammatic view with the joint members placed at an angle to each other. Fig. 5 is an end view of a joint member according to a modified construction, and Fig. 6 is an axial section of the said joint member. Figs. 7 and 8 show two different modifications of the transmission member. Fig. 9 shows a transmission member having convex roller members, the joint members being provided with corresponding concave races. Finally, Fig. 10 shows an embodiment with cylindrical roller members on the transmission member and plane races on the joint members.

In the embodiment according to Figs. 1 to 4, 1 designates the driving joint member and 2 the driven one. Each one of said members is provided with four clutch-like projections or arms 3, 4, 5, 6 and $3^1$, $4^1$, $5^1$, $6^1$, respectively, said arms opposing each other diametrically by pairs and each pair of opposing arms 3, 4 and 5, 6 and $3^1$, $4^1$ and $5^1$, $6^1$, respectively, lying at equal distance from the center of deflection 0 of the joint in such manner, however, that the one pair of arms 3, 4 and $3^1$, $4^1$, respectively, of each joint member 1 and 2, respectively, lies at a greater radial distance than does the second pair of arms 5, 6 and $5^1$, $6^1$, respectively, so that the outer arms 3, 4 and $3^1$, $4^1$, respectively, of each joint member 1 and 2, respectively, will embrace the inner arms $5^1$, $6^1$ and 5, 6, respectively, of the opposite joint member 2 and 1, respectively.

The clutches or arms are provided at the inside with beveled races 7, 8, 9, 10 and $7^1$, $8^1$, $9^1$, $10^1$, respectively, coinciding with cones 11, 12 having their apices turned towards each other and lying at the center of deflection 0 of the joint.

Placed between the said arms is a common transmission member, comprising a central portion 13, formed at the ends as conical rollers 14 and 15 capable of rolling on the corresponding races of the joint members. Formed on the transmission member outside the rollers are further bevelled toothed segments 16, 17 and $16^1$, $17^1$, respectively, meshing with corresponding bevelled toothed segments 18, 19 and $18^1$, $19^1$, respectively, on the outer arms 3, 4 and $3^1$, $4^1$, respectively. Preferably, the pitch cone of the said toothed segments may coincide with the peripheral surface of the corresponding roller 14 and 15, respectively, so that a correct rolling is obtained. If desired, the teeth may be truncated along the pitch cone either on the joint members or on the transmission member in order to facilitate the manufacture of the conical races or the rollers, respectively. The teeth on any of said parts may also be shaped as tops of teeth only, i. e. without the ordinary root portion.

The toothed segments 16, $16^1$ and 17, $17^1$, respectively, of the transmission member are formed on rectangular portions 20, 21 located outside the rollers 14 and 15, respectively, in order to facilitate the mounting and dismounting, respectively, of the joint, as will be more clearly described below.

The action of the above described universal joint is the following.

Commencing at the position of the joint members 1 and 2 shown in Fig. 1, in which the axis of the transmission member 13, 14, 15 lies in the bisectrix-plane P, it may firstly be assumed that the joint member 2 is swung to a position coaxial with the member 1. On account of the mesh between the toothed segments 16, 16¹, 17, 17¹ of the transmission member and the toothed segments 18, 18¹, 19, 19¹ of the joint members the transmission member, while rolling on the corresponding races of the joint members, will be swung about an angle equal to the half of the angle of deflection $\alpha$ between the axes. If then the driving joint member 1 be put in rotation, the movement will be transmitted through the transmission member at the same angular velocity to the driven joint member 2. In other words, in the said position the joint acts as an ordinary dog.

If it further be assumed—also commencing at the position in Fig. 1, where the axis of the transmission members lies in the bisectrix-plane, as mentioned—that the driving joint member 1 be rotated 90° to the position shown in Fig. 4, the transmission member will roll between the toothed segments and the races due to the displacement of the toothed segments of the driven joint member relatively to the toothed segments of the driving joint member and the axis of the transmission member will be set in a line P¹ deviating from the bisectrix-plane P. As a consequence, the driven joint member will obtain a certain lag during the said rotation period (90° from the position in Fig. 1), and during the continued rotation of the driving joint member 1 about an angle of 90° the driven joint member will fetch back the said lag, the axis of the transmission member being gradually set in the bisectrix-plane during this period of rotation.

During the following rotation of the driving joint member 1 a quarter of a revolution the above described course performed during the first period will be repeated, i. e. a lag or retardation of the driven joint member 2, whereas during the rotation of the joint member 1 the last quarter of the revolution the course during the second period will be repeated, i. e. a fetching back or acceleration of the driven joint member 2.

This means that at each revolution the angular velocity of the driven joint member is different from the angular velocity of the driving joint member.

This non-uniformity is dependent of the angle of deflection between the axes of the joint members and also on the relation between the radii of the toothed segments of the transmission member and the corresponding toothed segments of the joint members.

The latter conditions make it possible to construct universal joints according to the invention having varying speed differences by simply choosing different relations between the said radii, i. e. different gear ratios between the intermeshing toothed segments.

In the embodiment shown in Figs. 1 to 4 the said relation is chosen 2:5, and as a consequence the speed difference will be considerably smaller than in the common cardan joints.

However, there is nothing in the way of choosing the relation of the radii in such manner that the speed difference will be considerably greater than in the said cardan joints, if for any reason this would be desired.

Further, the embodiment shown in Figs. 1 to 4 is constructed for running in the forward as well as in the backward direction.

In the former case, in which the rotation is assumed to take place in the direction of the arrow shown in Fig. 2, the power transmission is effected by the aid of the transmission member 13, 14, 15 between the outer arms 3, 3¹ and 4, 4¹, while simultaneously the races 9, 9¹, 10, 10¹ of the inner arms 5, 5¹, 6, 6¹ are relieved of pressure. Thus, a certain play occurs between the rollers 14, 15 of the transmission member and the said races resulting in that the transmission member is able to roll freely on the outer races 7, 8 and 7¹, 8¹, respectively, at the above described settings of the said member.

At the backward running the power transmission is effected through the transmission member between the inner arms 5, 5¹ and 6, 6¹, while simultaneously the races 7, 7¹, 8, 8¹ of the outer arms, 3, 3¹, 4, 4¹ will be relieved of pressure from the rollers 14, 15.

The joint members 1 and 2 are kept together axially by means of the intermeshing toothed segments 16—18, 16¹—18¹, 17—19 and 17¹—19¹, in as much as the said segments by pairs 16, 18—16¹, 18¹ and 17, 19—17¹, 19¹, respectively, perform power moments, which counter-act each other. Simultaneously the toothed segments serve to take up axial thrusts acting on the joint and also, as mentioned, to govern the transmission member rolling between the races, so that the said member takes up the correct position under all conditions.

The dismounting of the joint members is performed in the following manner.

In the position shown in Fig. 1, the joint members 1 and 2 are deflected about such a great angle that the toothed segments of the joint members and those of the transmission members are brought out of mesh with each other. As a consequence the transmission member will be free and is then turned 90° from the position shown in Figs. 1 and 3, the joint members 1 and 2 being thereby free to be axially displaced. The mounting of the joint is performed in the reversed order.

The said possibility of mounting or dismounting the joint is dependent on this that in the embodiment above described the toothed segments are relatively narrow, i. e. contain but a few teeth. This entails that the maximum angle of deflection permissible during the function of the joint will be relatively small. Here, the said angle amounts to 22.5°, i. e. a value, which is quite sufficient in many cases.

If greater angles of deflection be desired, the toothed segments have to be made correspondingly longer, in which case difficulties may occur in the mounting or dismounting of the joint in the manner described.

For this purpose other steps may instead be taken, some examples of which are shown in Figs. 5, 6 and 7.

Figs. 5 and 6 show an end view and an axial section, respectively, of a driving joint member composed of several parts. The hub portion proper is made as a cubic body 1¹, to which plates 22 and 23 are firmly secured by means of screw bolts 24, the arms 3, 6 and 4, 5 projecting from said plates. The driven joint member is made in the same manner. A transmission member, which, if desired, may have circumferential toothed rims, can thus be placed between the displaced arm-plates, which are then secured to the hub portions. The arms are provided with toothed segments 18, 19 and races 7, 8, 9, 10 as in the former embodiment.

Fig. 7 shows an embodiment of a transmission member composed of several parts. In this case the conical roller bodies 14, 15 of the said member are each secured to a pin 13¹ and 13², respectively, said pins being seated in a common sleeve 25 and secured to same by means of through-going conical pins 26. The roller bodies 14, 15 are provided with circumferential bevelled toothed rims 16² and 17², respectively. Such a transmission member may be placed in a joint of the art shown in Figs. 1 to 4, but having longer toothed segments than those shown in the said figures and permitting of greater angles of deflection.

As mentioned in connection with Figs. 1 to 4, when running in the forward direction the inner races 9, 9¹, 10, 10¹ and when running in the backward direction the outer races 7, 7¹, 8, 8¹ shall be relieved of pressure in order that the transmission member shall be able of rolling freely on the one or the other group of said races. If, however, for any reason the required play should not be at hand between the roller bodies 14, 15 and the group of races temporarily relieved of pressure, it may happen that a sliding friction takes place between the roller bodies and the said races, whereby the free adjustment of the transmission member by rolling could be prevented.

In order to avoid this drawback the roller body may be made as two rings 14¹, 14² rotatable independently of each other, as shown in Fig. 8. For the rest the transmission member is of the same construction as in Fig. 7.

Fig. 9 shows an embodiment of a transmission member, which differs from that one shown in Fig. 7 by this only that the conical roller body 14 according to Fig. 7 is replaced by two barrel-shaped roller bodies 14³, 14⁴, which, if desired may be rotatably arranged on the pin 13¹ independently of each other. The generatrixes of the races 7, 7¹, 9, 9¹ on the arms 3, 3¹ and 5, 5¹ are concave in order to obtain the desired accommodation to the roller bodies. Evidently, there is nothing in the way of making the roller bodies with concave and the corresponding races with convex generatrix, if desired.

Finally, Fig. 10 shows a roller body having two cylindrical roller portions 14⁵ and 14⁶, which also, if desired, may be rotatably arranged on the pin 13¹ independently of each other. The races 7, 7¹, 9, 9¹ on the arms 3, 3¹, 5, 5¹ form plane surfaces. Preferably, the pitch cones 11, 12 may intersect the cylindric surfaces of the rollers at their middle points.

If desired, the joint may be made for transmission of power in the one direction only, in which case the inner joint arms shown may be dispensed with.

What I claim as new and desire to secure by Letters Patent of the United States of America is:

1. A universal joint having one center of deflection comprising a driving member, a driven member, substantially diametrically opposed races on each of said members, bevelled toothed elements on each of said members, a single rigid transmission member between said driving and driven member, roller elements on said transmission member bearing against the races of said driving and driven member, and bevelled toothed elements on said transmission member rigidly secured to each other and meshing with the said toothed elements on the driving and driven members, respectively.

2. A universal joint having one center of deflection, comprising a driving member, a driven member, substantially diametrically opposed beveled races on each of said members, bevelled toothed elements on each of said members, a single rigid transmission member between said driving and driven member, conical roller elements on said transmission member bearing against the races of said driving and driven member, and bevelled toothed elements on said transmission member rigidly secured to each other and meshing with the said toothed elements on the driving and driven members, respectively.

3. A universal joint having one center of deflection, comprising a driving member, a driven member, substantially diametrically opposed races on each of said members having a curved generatrix, bevelled toothed elements on each of said members, a single rigid transmission member between said driving and driven member, barrel shaped roller elements on said transmission member bearing against the races of said driving and driven member, and bevelled toothed elements on said transmission members rigidly secured to each other and meshing with the said toothed elements on the driving and driven members, respectively.

4. A universal joint having one center of deflection, comprising a driving member, a driven member, substantially diametrically opposed plane races on each of said members, bevelled toothed elements on each of said members, a single rigid transmission member between said driving and driven member, cylindrical roller elements on said transmission member bearing against the races of said driving and driven member, and bevelled toothed elements on said transmission member rigidly secured to each other and meshing with the said toothed elements on the driving and driven members, respectively.

5. A universal joint having one center of deflection, comprising a driving member, a driven member, substantially diametrically opposed races on each of said members, bevelled toothed elements on each of said members, a single rigid transmission member between said driving and driven member, roller elements on said transmission member bearing against the races of said driving and driven member, and bevelled toothed elements on said transmission member rigidly secured to each other and meshing with the said toothed elements on the driving and driven member, respectively, said driving and driven members comprising a plurality of interconnected parts.

6. A universal joint having one center of deflection, comprising a driving member, a driven member, substantially diametrically opposed races on each of said members, bevelled toothed elements on each of said members, a single rigid transmission member between said driving and driven member, roller elements on said transmission member bearing against the races of said driving and driven member, and bevelled toothed elements on said transmission member rigidly secured to each other and meshing with the said toothed elements on the driving and driven members, respectively, said transmission member comprising a plurality of interconnected parts.

7. A universal joint having one center of deflection, comprising a driving member, a driven member, substantially diametrically opposed beveled races on each of said members, bevelled toothed elements on each of said members, a single rigid transmission member between said driving and driven member, conical roller elements on said transmission member bearing against the races of said driving and driven member, and bevelled toothed elements on said transmission member rigidly secured to each other and meshing with the said toothed elements on the driving and driven members, respectively, the conical surface of said roller elements coinciding with the pitch cone of the toothed elements of said transmission member.

8. A universal joint having one center of deflection, comprising a driving member, a driven member, substantially diametrically opposed races on each of said members, bevelled toothed elements on each of said members, a single rigid transmission member between said driving and driven member, roller elements on said transmission member bearing against the races of said driving and driven member, and bevelled toothed elements on said transmission member rigidly secured to each other and meshing with the said toothed elements on the driving and driven members, respectively, the roller elements of said transmission member comprising each independently rotatable rings.

9. A universal joint having one center of deflection, comprising a driving member, a driven member, substantially diametrically opposed bevelled races on each of said members, bevelled toothed elements on each of said members, a single rigid transmission member between said driving and driven member, conical roller elements on said transmission member bearing against the races of said driving and driven member, and bevelled toothed elements on said transmission member rigidly secured to each other and meshing with the said toothed elements on the driving and driven members, respectively, the conical surface of said roller elements coinciding with the pitch cone of the toothed elements of said transmission member, said pitch cone having its apex lying at the said center of deflection.

10. A universal joint having one center of deflection, comprising a driving member, a driven member, four clutch-like projections on each of said members, substantially diametrically opposed by pairs, each pair lying substantially at the same distance from the center of deflection, the one pair of projections of each of said members lying at a greater distance from the said center than does the second pair, said outer projections of each member embracing the said inner projections of the opposite member, races on each of said projections, bevelled toothed elements on two pairs of said projections, a single transmission member between all of said projections, roller elements on said transmission member bearing against said races, and bevelled toothed elements on said transmission member rigidly secured to each other and meshing with the said toothed elements on said projections.

11. A universal joint having one center of deflection, comprising a driving member, a driven member, four clutch-like projections on each of said members substantially diametrically opposed by pairs, each pair lying substantially at the same distance from the said center of deflection, the one pair of projections of each of said members lying at a greater distance from the said center than does the second pair, said outer projections of each member embracing the said inner projections of the opposite member, bevelled races on each of said projections, bevelled toothed elements on two pairs of said projections, a single transmission member between all of said projections, conical roller elements on said transmission member bearing against said races, and bevelled toothed elements on said transmission member rigidly secured to each other and meshing with the said toothed elements on said projections.

12. A universal joint having one center of deflection, comprising a driving member, a driven member, four clutch-like projections on each of said members substantially diametrically opposed by pairs, each pair lying substantially at the same distance from the center of deflection, the one pair of projections of each of said members lying at a greater distance from the said center than does the second pair, said outer projections of each member embracing the said inner projections of the opposite member, races on each of said projections, bevelled toothed elements on two pairs of said projections, a single transmission member between all of said projections, roller elements on said transmission member bearing against said races, and bevelled toothed elements on said transmission member rigidly secured to each other and meshing with the said toothed elements on said projections, the roller elements of said transmission member comprising each two independently rotatable rings.

SVEN GUSTAF WINGQUIST.